United States Patent Office 2,790,463
Patented Apr. 30, 1957

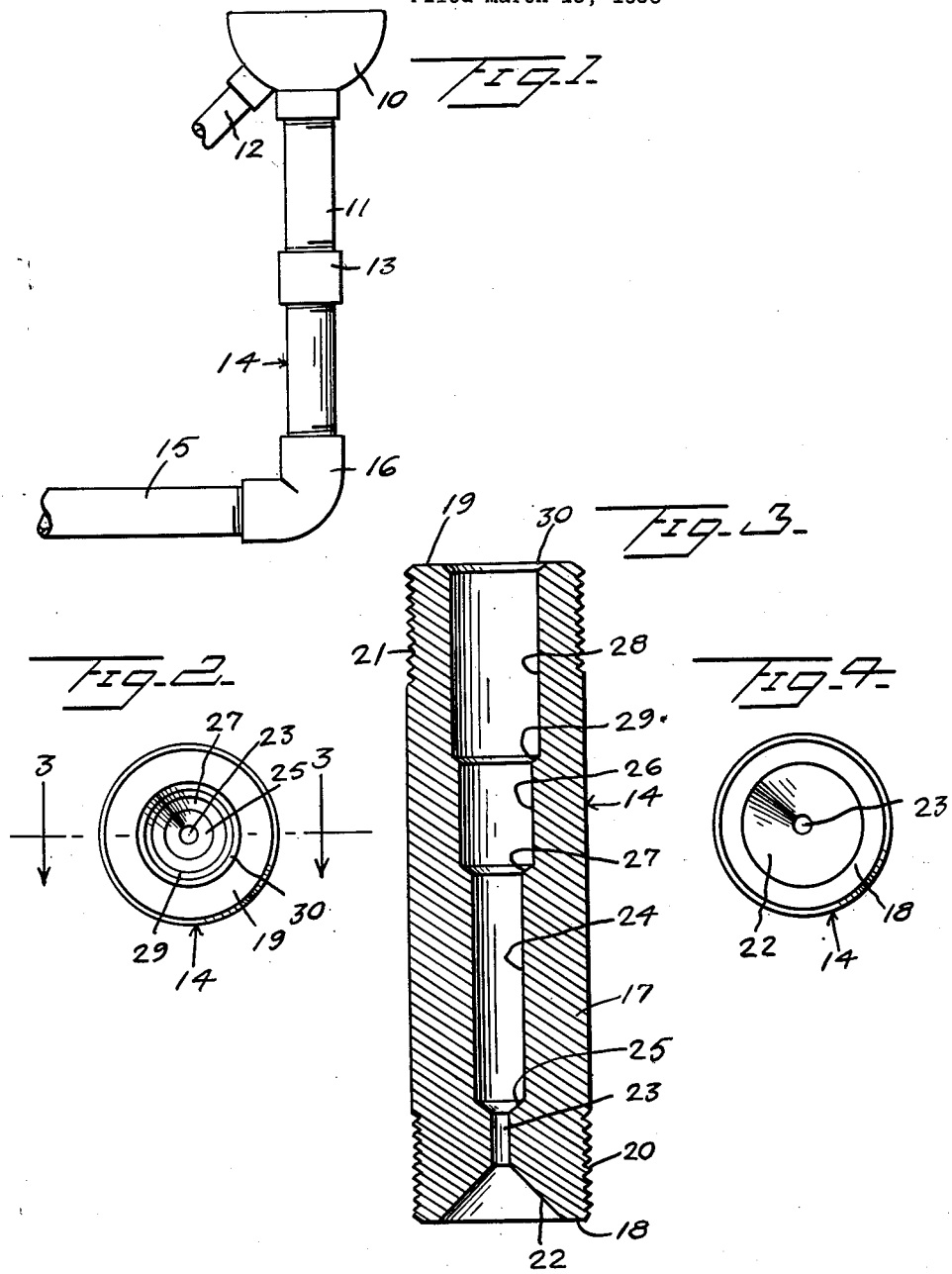

2,790,463

FLOW REGULATOR

Bernard A. Delano, Bellaire, and Ross E. McGlothlin, Sinton, Tex., assignors to Delano & Garner Manufacturing Co., Houston, Tex., a partnership Application March 19, 1956, Serial No. 572,562

3 Claims. (Cl. 138—44)

The present invention relates to flow regulators, and more particularly, for flow regulators adapted for regulating the flow of fluids in conduits. This application is a continuation-in-part of my copending application, Serial No. 362,004, filed June 16, 1953, now abandoned, and entitled Device for Control of the Flow of Water to Drinking Fountains.

The primary object of the invention is to provide a device which can be inserted in the fluid conduits to regulate the flow of fluid therethrough.

Another object of the invention is to provide a regulator of the type described above which will completely eliminate spurting of the type created by excessive pressure changes in the water supply.

A further object of the invention is to provide a regulator of the class described above which is completely devoid of moving parts requiring no adjustments to maintain an even flow through the conduits.

A still further object of the invention is to provide a fluid flow regulator of the class described above which can be manufactured from a single piece of material eliminating all assembly and disassembly problems with relation to the regulator per se.

Another object of the invention is to provide a fluid flow regulator for controlling fluid flow in conduits which will be inexpensive to manufacture, simple to install, effective in use, and quite durable in service.

Other objects and advantages will become apparent in the following specification when considered in the light of the attached drawings, in which:

Figure 1 is a fragmentary side elevation of a drinking fountain showing the invention installed in the water feed line thereof.

Figure 2 is a plan view of the invention.

Figure 3 is a vertical cross-section taken along the line 3—3 of Figure 2, looking in the direction indicated.

Figure 4 is a bottom plan view of the invention.

Referring now to the drawings in detail wherein like reference numerals indicate like parts throughout the several figures, the reference numeral 10 indicates generally a water fountain of the type having a water inlet pipe 11 and a waste pipe 12. The water inlet pipe 11 is secured to the bottom of the fountain 10 and has a coupling 13 threadedly engaged to its lower end. A flow regulator 14 is threadedly engaged to the opposite side of the coupling 13 and has its opposite end connected to a water conduit line 15 by means of an elbow 16.

The water fountain 10, water supply pipe 11, waste pipe 12, and water conduit line 15, along with the coupling 13, and elbow 16, are all of conventional construction and are here shown to illustrate the utility of applicants' invention.

The flow regulator 14 comprises cylindrical body 17 having an inlet end 18 and an outlet end 19 oppositely disposed thereon. External threads 20 are formed on the cylindrical body 17 adjacent the inlet end 18 thereof and external threads 21 are formed on the body 17 adjacent the outlet end 19 thereof. The threads 20 and 21 are of conventional pitch and are adapted to cooperate with standard pipe fittings of the proper size.

The body 17 is provided at its inlet end 18 with an axially positioned inwardly tapering conical bore 22, the sloping wall of which extends at an angle of 45° to the inlet end 18 of the body 17. An axial bore 23 having a relatively narrow diameter extends axially inwardly from the inner end of the conical bore 22, as best illustrated in Figure 3.

An axial bore 24 has a diameter somewhat greater than the diameter of the bore 23 and is joined to the bore 23 by means of a conical bore 25 which has the sloping wall thereof extending at an angle of 59° to the axis of the body 17. An axial bore 26 having a diameter somewhat larger than the bore 24 is formed in the body 17 and joined to the bore 24 by means of a conical bore 27 which has the sloping wall thereof extending at an angle of 59° to the axis of the body 17. An axially extending cylindrical bore 28 is provided with a diameter somewhat greater than the diameter of the bore 26 and is joined thereto by means of a conical bore 29 having the walls thereof sloped at an angle of 59° to the axis of the body 17.

The cylindrical bore 24 extends a substantial distance through the body 17 with a cylindrical bore 28 being approximately four-fifths as long as the bore 24. The cylindrical bore 26 is approximately one-half the length of the cylindrical bore 24 and the cylindrical bore 23 is approximately one-fourth the length of the cylindrical bore 24.

The outlet end 19 of the body 17 is chamfered into the bore 28, as illustrated at 30, at an angle of 45° to the outlet end 19 of the body 17.

As is clearly shown in Figure 3, the body 17 is provided with a Venturi-like formation opening into a plurality of compartment of increasing size.

In the use and operation of the invention, the body 17 is positioned, as illustrated in Figure 1, in the feed line of a water fountain 10. Water flowing through the feed conduit 15 will pass through the bore 23, filling the bores 24, 26, and 28 successively, thus providing a body of water standing in the flow regulator 14. Additional flow of water through the conduit 15 and the bore 23 will cause, at low pressures, a conventional flow of water from the fountain 10. Increased pressures in the conduit 15 will cause an increase in the velocity of flow of fluid through the bore 23 creating within the bores 24, 26 and 28 a considerable turbulence will effect a drag or friction on the flow of water therethrough to the extent that no additional water or additional pressures will be encountered at the fountain 10. Hence, the fountain 10 will continue to flow in a conventional manner without spurting.

The flow regulator 14 has been found to be completely effective when used with inlet pressures varying from twenty to sixty pounds and in this range of pressures has completely eliminated all tendency of the fountain 10 to spurt or otherwise become inoperative due to pressure changes.

Obviously, while the regulator 14 is particularly effective in solving a problem long encountered in the drinking fountain art, it can be similarly used in other apparatus where it is desirable to eliminate flow pressure differentials.

The turbulent action of the water as it flows into the bores 24, 26 and 28 appears to be partly created at least by eddy currents established by the high velocity of the flow of fluid through the bore 23.

In the form of the invention illustrated in the accompanying drawings the overall length of the regulator 14 from the inlet end 18 to the outlet end 19 is two and nine-sixteenths inches, the bore 22 having a depth of seven-thirty-seconds inch and the bore 23 having a length of seven-thirty-seconds inch. The bore 24 and the conical bore 25 together have a length of fifteen-sixteenths inch while the bore 26 and the conical bore 27 together have a length of seven-sixteenths inch. The bore 28, conical bore 29 to the end 19 of the body 17 collectively have a length of three-quarters of an inch. The bore 28 has a diameter of eleven-thirty-seconds inch while the bore 26 has a diameter of nineteen-sixty-fourths inch. The bore 24 has a diameter of three-sixteenths inch and the bore 23 has a diameter of .052 or .063 inch to provide for variations in the desired outlet pressures.

While specific dimensions and angles have been listed herein to thoroughly and completely disclose an operating embodiment of the invention, it should be understood that the application is not so limited.

Having thus described the preferred embodiment of the invention, it should be understood that numerous structural modifications and adaptations may be resorted to without departing from the scope of the appended claims.

What is claimed is:

1. A flow regulator comprising a body for connection in a water supply conduit, said body having a conical axial bore extending inwardly from one end with its inner end communicating with an axial bore of cylindrical form extending into said body, said body having a substantially longer axial bore of cylindrical form extending axially of said first axial bore and communicated therewith by means of a conical bore, the diameter of said second axial bore being somewhat larger than the diameter of said first axial bore, said body having a third axial bore of a diameter somewhat larger than said second axial bore and connected thereto in axial end to end alignment by means of a conical bore, said body having a fourth cylindrical axial bore connected to said third cylindrical axial bore by means of a conical bore with said fourth cylindrical axial bore communicating with the outlet end of said body whereby said body is provided with a continuous passage extending therethrough.

2. A device as claimed in claim 1 wherein said third cylindrical axial bore is substantially shorter than said second cylindrical axial bore and somewhat longer than said first cylindrical axial bore.

3. A device as claimed in claim 2 wherein said fourth cylindrical axial bore is somewhat shorter than said second cylindrical axial bore and somewhat longer than said third cylindrical axial bore.

References Cited in the file of this patent

UNITED STATES PATENTS

| | | |
|---|---|---|
| 1,744,842 | Suverkrop et al. | Jan. 28, 1930 |
| 2,533,907 | Anderson | Dec. 12, 1950 |
| 2,694,296 | Prosek et al. | Nov. 16, 1954 |